Patented Apr. 5, 1927.

1,623,519

UNITED STATES PATENT OFFICE.

RICHARD BAYBUTT AND EDWARD S. FARROW, JR., OF ROCHESTER, NEW YORK, ASSIGNORS TO EASTMAN KODAK COMPANY, OF ROCHESTER, NEW YORK, A CORPORATION OF NEW YORK.

PROCESS OF BLEACHING CELLULOSE ACETATE.

No Drawing.          Application filed October 28, 1925. Serial No. 65,485.

This invention relates to processes of bleaching cellulose acetate. One object of the invention is to provide a process of bleaching cellulose acetate which can be operated quickly and under proper control and yet will not degrade the product and will act independently of any hydrolyzing steps, without complicating the latter. Another object of the invention is to provide a bleaching process which will operate without any contamination of the product and without introducing any ingredient which requires a special removal step. Other objects will hereinafter appear.

Cellulose acetate is made into many products which require it to be free from color within strict manufacturing tolerances. In photographic films, for instance, it is desirable that any brownish or yellowish color be removed or restricted to insigificant amounts. It is, of course, desirable to remove the color before the cellulose acetate is made into the final composition out of which films, varnishes and the like are prepared.

But it is not a simple matter to carry on the bleaching safely and inexpensively during the preparation of the cellulose acetate. In the customary process of making cellulose acetate, the chloroform-soluble species is first prepared in a reaction mixture comprising acetic acid, acetic anhydride and a catalyst. The cellulose acetate thus formed, is then converted into the acetone-soluble species by hydrolysis. In order to recover the excess of acetic acid and acetic anhydride and simultaneously obtain the chloroform-soluble cellulose acetate in a readily treatable form, the reaction mixture may be converted into a powder and the acetic values evaporated off and recovered. This powder may then be subjected to hydrolysis in order to impart acetone solubility to it. As an alternative, the conversion of the chloroform-soluble cellulose acetate into the acetone-soluble form may be effected in the reaction mixture and then the latter be converted into powder with recovery of the acetic values through evaporation and condensation.

We have found that the cellulose acetate may be bleached at any of the stages of these known processes, by means of ozone, without interfering with or complicating any of the process steps and without introducing any impurities which would have to be eliminated from the product. Moreover, by using ozone, we can avoid the excessive corrosive action which attends the use of other bleaching agents.

We shall now describe the preferred embodiment of our invention by way of illustration, but it will be understood that the invention is not limited to the details, thus given, except as indicated in the appended claims. In U. S. Patent No. 1,516,225, Webb, Nov. 18th, 1924, process of manufacturing cellulose acetate, a powdery form of cellulose acetate is obtained by a spraying process in which the acetic values are recovered. The powder thus obtained is treated with an aqueous bath to bleach out any impurities that may remain. During such leaching operation ozonized air, obtained by any of the well known methods of preparing it, is bubbled through the mixture of water and cellulose acetate particles. Alternatively we may dry the washed powder and pass the ozone through the dried powder.

Where the preparation of the powder takes place at the chloroform-soluble stage, the powder is treated with an aqueous acid solution to convert it into the acetone-soluble species. It is a feature of our process that we can bubble in ozonized air during this conversion step without in any way complicating it and without contaminating the mixture. The action is simply continued until the ozone has effected the necessary reduction in color, as indicated by any convenient visual test of a sample.

While we prefer to bleach the cellulose acetate when it is in a subdivided form, such as is indicated in the Webb patent cited above, or in Patent No. 1,494,816, Seel, May 20th, 1924, process of manufacturing cellulose acetate, No. 1,536,311, Seel, May 5th, 1925, intermediate product in the manufacture of cellulose acetate, No. 1,494,830, Cook, May 20th, 1924, process of manufacturing cellulose acetate, nevertheless, we can bleach the cellulose acetate while it is in the form of a reaction dope or solution. The ozonized air or oxygen may be discharged into the reaction dope and agitated through it in the same way as the gaseous vehicle is passed through the reaction mass in the Seel patents cited above. Moreover, the ozone may be passed through the final solution or dope composed of purified cellulose acetate and suitable organic solvents.

Where cellulose acetate is precipitated in a large excess of water by stirring and pouring the flowable reaction dope therein, the precipitate, either in the washed or eventually dried conditions, can be readily and safely bleached by passing ozonized air thoroughly therethrough.

In the bleaching of cellulose acetate, by any of the modifications enumerated above, the color is readily brought within the manufacturing tolerances before any appreciable degradation or molecular change takes place in the cellulose acetate. Consequently the bleaching may be superposed upon or combined with the other steps of treating the cellulose acetate, without interfering with such steps. For example, it avoids the saponification of the cellulose acetate which would take place if an alkaline bleach were employed, such as sodium peroxide. It likewise avoids any hydrolysis which would take place if an acid bleach were employed, such as an acid permanganate mixture. At the same time inexpensive vessels may be employed for the treatment because it does not corrode the vessels to a harmful extent, such as chlorine gas tends to do. Moreover, the danger to the workmen is much less than would be the case if chlorine were employed and a break occurred in the apparatus.

Having thus described our invention, what we claim as new and desire to secure by Letters Patent is:

1. The process of bleaching cellulose acetate which comprises bringing the latter into active contact with gaseous ozone.

2. The process of bleaching cellulose acetate which comprises bringing a stream of an inert gaseous vehicle carrying gaseous ozone into intimate contact with all parts of a mass of cellulose acetate.

3. The process of bleaching cellulose acetate, which comprises bringing gaseous ozone into contact with said cellulose acetate, while the latter is in comminuted form.

4. The process of bleaching cellulose acetate which comprises passing an inert gaseous vehicle carrying gaseous ozone through an aqueous bath containing cellulose acetate in powdered form.

Signed at Rochester, New York, this 19th day of October, 1925.

RICHARD BAYBUTT.
EDWARD S. FARROW, Jr.